United States Patent [19]

Guy et al.

[11] Patent Number: 4,917,905

[45] Date of Patent: * Apr. 17, 1990

[54] PROCESS FOR MANUFACTURING COOKED PRESSED CHEESES

[75] Inventors: Bussiere Guy, Ramonville; Lablee Jean, Mamirolle, both of France

[73] Assignee: Roquette Freres, Lestrem, France

[*] Notice: The portion of the term of this patent subsequent to Jul. 25, 2006 has been disclaimed.

[21] Appl. No.: 313,309

[22] Filed: Feb. 21, 1989

Related U.S. Application Data

[63] Continuation of Ser. No. 942,679, Dec. 17, 1986, abandoned.

[30] Foreign Application Priority Data

Dec. 17, 1985 [FR] France .................................. 85 18686

[51] Int. Cl.⁴ ...................... A23C 19/05; A23C 19/068
[52] U.S. Cl. ........................................ 426/39; 426/40; 426/582
[58] Field of Search ........................ 426/34, 36, 37, 38, 426/39, 40, 42, 43, 61, 580, 582, 491, 657

[56] References Cited

U.S. PATENT DOCUMENTS

| | | |
|---|---|---|
| 2,982,652 | 5/1961 | Hammond et al. |
| 3,886,288 | 5/1975 | Rice et al. ............................ 426/36 |
| 4,020,186 | 4/1977 | Edwards ............................... 426/39 |

OTHER PUBLICATIONS

Mabbitt et al. "Experiments in Cheese Making without Starter", J. Dairy Res. vol. 22, 1955 pp. 365–373.
Hicks et al. "Equip. and Procedure of Manufacturing Lab. Cheese Curd." J. Dairy Sci. vol. 64, No. 3. 1981, pp. 523–525.

*Primary Examiner*—Marianne Cintins
*Attorney, Agent, or Firm*—Fleit, Jacobson, Cohn, Price, Holman & Stern

[57] ABSTRACT

In the process of the invention for manufacturing cooked pressed cheeses from raw milk, in the course of the phase of preparation of the milk before renneting, an acidogen selected from the group consisting of gluconolactones and glucoheptonolactones is added to the milk in an amount sufficient to attain simply and reliably, in a predetermined time, the exact predetermined renneting pH comprised between 6.70 and 6.40. The acidogen is advantageously gluconodeltalactone. The process is applied in the manufacturing of cooked pressed cheeses with mastery of the acidification phase of the milk.

9 Claims, No Drawings

PROCESS FOR MANUFACTURING COOKED PRESSED CHEESES

This application is a continuation of application Ser. No. 942,679, filed Dec. 17, 1986, now abandoned.

The invention relates to a novel process for manufacturing cooked pressed body cheeses or "cooked pressed cheeses".

More precisely, the invention relates to a novel process for manufacturing cooked pressed cheeses according to which the acidification of the milk before renneting is carried out in a controlled manner by means of an acidogen.

Within the scope of the invention, by cooked pressed cheeses is meant, in accordance with the classification given in the work "Le Fromage", coordinated by André ECK, Technique et Documentation (Lavoisier), Paris (1984), especially pages 222–223, in particular those of which the manufacture process comprises, besides a pressing phase, a phase of cooking the curd-whey mixture to a temperature generally comprised between 45° and 55° C. and of which the dry extract is generally comprised between 60 and 70%, such as cheeses of the gruyère, emmental, comté, Beaufort, grana like parmesan type.

It is recalled that, traditionally, the manufacture of cooked pressed cheeses comprises essentially the following steps:

Preparation of the milk

This expression implies the operations:

possible heat treatment of the raw milk: generally carried out in the manufacture of cheeses of the emmental type when raw milk is employed in the case, for example, of certain cheeses with a certificate of controlled origin such as cheeses of the comté and Beaufort types, possible maturation by the action of lactic ferments which produce acidification of the milk to a pH value corresponding to the requirements for the subsequent step of renneting, generally comprised between 6.70 and 6.40.

It is to be noted that this maturation which was not necessary in former times, is much more current today, since modern methods of collecting the milk have led to a rise in the pH of the milk measured at the time of its reception at the plant. In particular, winter milk shows itself to be generally less acid whence the necesity of a pH correction by maturation.

Renneting

The maturated milk is supplemented with coagulating enzymes.

Coagulation

Generally, it is possible to say that cooked pressed cheeses require a coagulation of the "renneting" type. However, if the acidification is of a relatively modest level, it has nonetheless great importance as to its incidence on the subsequent steps of the manufacture and on the characteristics of the finished cheese.

Cutting up-cutting with grinding

This operation corresponds to a progressive division of the coagulum, passing from a first stage of cutting up the curd into morsels of about 50 cm$^3$ until the production of the desired final size (curd grains of some mm diameter), this in acting on the form and the speed of the curd-slicers.

In practice, the two phases are more often clearly distinct, separated by a time of standing or of slight stirring.

Heating (or cooking)

It is carried out indirectly, by the addition of steam or hot water, for example, in a double jacket, the stirred curd-whey mixture being brought gradually to the desired temperature, in the vicinity of 50° C., according to the type of cheese.

Grinding or milling

This mechanical action accentuates the outflow of the whey from the curd grains.

Moulding

Pressing

This sphase permits the shaping or forming and the obtaining of the cohesion of the cheese, whilst achieving the extraction of the whey.

Taking from the mould

Ripening

It comprises conventionally three successive phases of placing in a cold cellar, then in a warm cellar, then again in a cold cellar, the times and temperatures relating to these different phases being according to the type of cheese manufactured.

In any event, in the manufacture of the different types of cooked pressed cheeses, the phase of preparation of the milk presents a primordial importance; the invention aims at improving this phase.

The milk used in the manufacture of cooked pressed cheeses requires a maturation phase in the factory, taking into account the conditions of collection of the milk as well as by reason of a quest for a raw material which is more and more constant from the point of view of better mastery of the manufacture.

In order to bring the milk to the required pH for renneting, recourse has been had to maturation based on an addition of mesophilic lactic ferments. It is well understood that this addition is to be distinguished from that of thermophilic lactic flora conventionally employed in the manufacture of cooked pressed cheeses, this flora having an effect, acidifying among others, not on the renneting but particularly on the subsequent phases with a view to good progress of ripening.

In the case of raw milk, the maturation may be ensured by the effect along of the wild lactic flora, present in the milk. The drawbacks are then associated with the fact that the milk must be kept at a relatively high temperature for the activation of this flora, and especially associated with the fact that the maturation times are very variable since the flora present is itself very fluctuating from one day to the next. It may also be ensured by an addition of a preparation of mesophilic lactic flora. The drawbacks are reduced but not eliminated. This addition must be at a very low level, taking into account the low level of acidification sought; consequently the variability associated with the wild flora is only weakly buffered.

An addition at a higher concentration would buffer more validly the variations in the wild flora, but the drop in pH would then be too rapid, taking into account the high degree of accuracy sought as to the pH on renneting and also taking into account the fact that the pH would continue to evolve until the destruction of the mesophilic lactic flora in the course of the cooking, which would have undesirable consequences in the subsequent steps.

In the case of heat-treated milk, the drawbacks noted above are less marked but are nonetheless still present.

Consequently, it will appear clearly that a correction of the pH so limited, so accurate, and so variable as a function of the batches of milk, proves to be very delicate and very laborious to carry out by the use of a fermentation technique based on lactic ferments, all the more as the mastery of the mesophilic lactic fermentation required for this maturation cannot be ensured by heat treatment at the end of maturation which, in any event, in order not to alter the suitability of the milk for the manufacture of cooked pressed cheeses, should be limited to a temperature of 65° C., for a time of 40 seconds, which is insufficient to ensure almost complete destruction of the lactic flora.

Now, it is well known to the man skilled in the art that the pH on renneting is capital with respect to:

the subsequent operation of cutting with grinding as to the firmness of the curds, to avoid the formation of "fines", the texture of the curd, the final dry extract of the manufactured cheese, the course of ripening.

Knowing, moreover, that very small variations in the pH on renneting have substantial consequences on the subsequent stages, there is therefore an interest which is certain in developing a novel process for rendering possible the removal of the above-described drawbacks, inherent in the operation of preparation of the milk for the manufacture of cooked pressed cheeses.

Applicants have developed a novel process for manufacturing cooked pressed cheeses enabling the mastery of the step of preparation of the milk, which results in an increased constancy in the different phases of manufacture and a greater regularity of the characteristics of the cheeses obtained.

This novel process for manufacturing cooked pressed cheeses is characterized by the fact that the milk is acidified in a controlled manner, particularly from its initial pH value on reception, comprised customarily between 6.60 and 6.80, to a pH value comprised between 6.70 and 6.40, by means of an acidogen.

Applicants have in fact observed that, surprisingly, the use of an acidogen enabled the pH of the milk to be lowered before renneting in limited and reliable manner, and this simply and within a predetermined time, without unfavorably affecting the subsequent steps of manufacture of cooked pressed cheeses and the organoleptic characters of the products obtained.

The raw material milk serving for the manufacture of cooked pressed cheeses according to the present invention, may be any milk or mixture of milks of any origin, in particular those customarily employed in the manufacture of cooked pressed cheeses according to the prior art.

By acidogen, is meant here any substance neutral from the point of view of pH and capable, after solubilization in an aqueous medium, of being gradually converted into an acid.

Among the substances of this type, are found certain acid anhydrides, lactides and particularly those with a low melting point of lactic acid, lactones such as gluconolactones and glucoheptonolactones, and the like and/or their mixtures.

These definitions having been given, according to the invention, there is provided a process for manufacturing cooked pressed cheeses comprising essentially the successive steps of preparation of the milk, renneting, coagulation, cutting up-cutting with grinding, cooking, grinding, moulding, pressing, taking from the mould and ripening, characterized by the fact that in the course of the phase of preparation of the milk, the latter is acidified in a controlled manner to a pH value comprised between 6.70 and 6.40, by means of an acidogen.

It is well known that the kinetics of converting an acidogen into an acid is strictly dependent on the temperature of the aqueous medium in which it is solubilized. Consequently, from the three basic parameters of the milk used in the cheese-making industry which are:

the initial pH of the milk, the pH required for renneting, the temperature of the milk, the technician can determine accurately the dose of acidogen to be incorporated and the time required for reaching the desired renneting pH, knowing with certainty the hydrolysis kinetics of the acidogen.

This improvement brought about by the addition of the acidogen at the time of maturation therefore leads to a complete and total mastery of the preparation phase of the milk.

This addition of acidogen may be done indifferently in the form of powder or in the form of solution.

In the case where the acidogen is added in powdered form, its dispersion in the milk and its solubilization are ensured by any suitable stirring means.

In the case where it is preferred to add this acidogen in the form of a solution, the latter is advantageously prepared at the time of use, in order to limit, as much as possible, the hydrolysis of the acidogen. In fact if, through this hydrolysis, the acidogen solution shows too great an acidity, the advantage of gradual acidification would disappear when the disadvantages associated with the direct use of acids in the industrial production of cooked pressed cheeses would again manifest themselves.

In practice, and taking into account the particularities peculiar to each cooked pressed cheese production line, the technician, knowing the hydrolysis kinetics of the acidogen employed, will determine the best moment for introducing it.

By way of indication, the acidogen could be introduced:

into the raw milk, or into the milk after possible heat treatment.

It is well understood that other modifications could be envisaged.

In all cases, it is convenient, to determine the moment at which the acidogen must be introduced, to take into account its hydrolysis kinetics at the temperature of the milk at the moment of the introduction and until renneting.

In certain cases, it will be preferred to choose a dose of acidogen such that, after complete hydrolysis of this agent, the milk is at the required pH for renneting. In other cases, this dose could be greater, so that the hydrolysis of the acidogen at the determined pH for the renneting is incomplete, thus facilitating subsequent acidification of the renneted milk.

Thus a suitable dose of acidogen can enable mastery of the acidification in the course of the manufacturing steps which follow renneting, particularly by ensuring a reproducible drop in pH from renneting to coagulation and then at least until cutting with grinding.

This controlled acidification on renneting and in the course of the steps which follow renneting is advantageously practiced when the ferments employed for the subsequent acidification of the curd have a long latent period, particularly in the case of the use of ferments for the direct seeding of the milk, used in frozen or lyophilized form.

In the same way, Applicants have observed that the controlled acidification on renneting and in the course of the steps which follow renneting, would permit, under certain conditions, a reduction in manufacturing times.

Besides the technical advantages associated with the mastery of the pH during the maturation, Applicants have also established the fact that the replacement of the mesophilic lactic ferments by an acidogen in the maturation phase was without significant incidence on the characteristics of texture and taste of the ripened cooked pressed cheeses.

The process according to the invention does not imply however the elimination of thermophilic lactic ferments or possibly the elimination of mesophilic lactic ferments or of any other ferment. It is, in fact, possible to introduce lactic ferments or any other microorganism in the course of the employment of the process according to the invention, in an amount and at a moment which will be a function of the desired technological or qualitative objectives.

The acidogens used preferably within the scope of the invention are the gluconolactones and the glucoheptonolactones, more preferably the gluconolactones and particularly gluconodeltalactone (GDL).

Besides the aforesaid advantages, the excellent solubility in aqueous media of GDL and its hydrolysis kinetics at temperatures traditionally encountered particularly before renneting, make it perfectly adapted to the particular requirements for the manufacture of cooked pressed cheeses, particularly in the preparation step of the milk before renneting.

Advantageously, the amount of acidogen employed within the scope of the invention is from 1 to 500 g/hl of milk. Preferably, it is comprised between 2 and 200 g/hl of milk, according to the acidogen used.

Thus, in the particular case where the acidogen is GDL, the amount employed is advantageously from 1 to 100 g/hl of milk. Preferably, it is comprised between 2 and 50 g/hl of milk.

The invention will be better understood by means of the examples which follow and which include the description of advantageous embodiments. All these examples have been carried out by I.T.I.L. in the premises of Ecole Nationale d'Industrie Laitière of Mamirolle-Besancon (France).

Examples of the manufacture of cooked pressed cheeses of the comté type.

EXAMPLE 1—Control

It relates to the manufacture of a comté type cheese, based on whole raw milk. It is produced from a winter milk whose pH on its introduction into the maturation vat is 6.70±0.02. It is received the day before in the morning and left at 6° C. in a "holding" vat (buffer time) until the following morning when a volume of 400 l of this milk is introduced into the copper vat traditionally used for the manufacture of this type of cooked pressed cheeses. It is gradually heated by injecting steam into the double jacket.

When the temperature reaches 15° C., maturation is started up by the addition of lactic ferments:

Mesophilic lactic ferments employed according to the following conditions: a concentrated and frozen preparation marketed by MILES Laboratories—Division Marshall (rue des Longs Réages—28230 Epernon, France), is cultivated on Marstar nutrient medium, marketed by the same Laboratories, applying strictly the preparation conditions recommended by said Laboratories. 0.1% of this culture (expressed by volume with respect to the milk), namely 0.4 l, is then mixed with the 400 l of milk.

Lactic ferments of the thermophilic streptococci type prepared previously as follows: a concentrated, frozen commercial preparation coming from the MILES Laboratories—Division Marshall is cultivated on the nutrient medium marketed under the name "412 A" by MILES Laboratories by applying strictly the preparation conditions recommended by these Laboratories. 0.1% of this culture is mixed with the milk.

When the temperature of the milk reaches 31.5° C., namely about 15 minutes after the start of maturation, it is stabilized at this value by stopping the steam heating.

45 minutes later, the introduction of the thermophilic lactic ferments constituted by a mixture of a lyophilized preparation of thermophilic streptococci and a lyophilized preparation of *Lactobacillus helveticus* and *lactis* coming from the LACTO-LABO Company (BP 10-23, rue du Collège—86220 Dange-Saint-Romain, France), cultivated on skimmed milk sterilized in the autoclave under conditions selected so that, after the incubation, the culture contains approximately 50% of streptococci and 50% of Lactobacillus (estimate made by microscopic examination), is done.

0.05% of this culture is mixed with the milk.

15 minutes later, namely 60 minutes after the start of maturation, the pH must have reached 6.60 (in the present case, it is 6.63±0.02). The renneting is then carried out by an addition of coagulating enzymes in the form of a commercial preparation known under the name of concentrated rennet extract (assayed at 690 mg of chymosin per liter) such as that marketed by the GRANDAY Company (Zone industrielle de Beaune Nord—B.P. 3—21201 Beaune Cedex, France). The concentration of 0.17 ml/l of milk is necessary.

It is to be noted that the total duration of maturation is modified in the course of the year to take into account seasonal variations of the pH of the milk, this time only being, for example, 30 minutes in summer.

The milk is left standing for correct coagulation. Under the conditions of this test, coagulation appears after 25 minutes, this time being traditionally called "setting time". A hardening time of 4 minutes is also observed, after which manual cutting-up takes place by means of the wire apparatus traditionally employed for this operation. Movements in two perpendicular directions enable the coagulum to be cut up into pieces of about 50 cm$^3$. This operation being terminated, the curd is grinded manually with care for about 2 minutes with a sort of shovel called a "ladle".

A resting time of 2 minutes is then observed and then the cutting-up of the curd is resumed by means of the same wire apparatus as previously. This phase known under the name "cutting with grinding" is pursued for about 3 minutes until the curd has been cut up into grains of about 3 mm diameter.

The curd-whey mixture is then stirred mechanically for a time of about 4 minutes, this slow stirring avoiding the curd grains from reuniting.

The cooking is then carried out by gradual heating of the curd maintained under mechanical stirring, by injection of steam into the double jacket, according to the following precise kinetics:

up to 35° C. at the rate of 1° C./2 min.

up to 47° C. at the rate of 2° C./3 min.
up to 53° C. at the rate of 1° C./1 min.

The cooking is stopped at the precise temperature of 53° C. The total duration of heating is hence 31 minutes.

The curd is kept under stirring for further 30 minutes, until the grains of curd have reached the desired texture, evaluated manually. The pH is then 6.50±0.02 and the temperature is 51° C.

The moulding of the cheese is then carried out by means of an apparatus for racking under vacuum such as that of the CHALON-MEGARD Company (01460 La Cluse, France) which transfers the whole of the curd-whey mixture into a comté cheese mould (diameter: 63 cm, height: 24 cm) also marketed by the CHALON-MEGARD Company. The extraction of the whey is continued for 13 minutes by withdrawal by means of a vacuum of about $4.10^4$ Pa (30 cm of mercury).

The cheese maintained in its mould is then withdrawn from the racking machine and undergoes pressing by the injection of compressed air into the plastic pouch provided for this purpose and situated at the top of the mould. A first pressing of 2 hours under a pressure of 0.5 bar is followed by a second pressing of 4 hours under a pressure of 1 bar. Following this the pressing is stopped and the cheese is left in its mould until the following morning.

The taking from the mould is then carried out. A cheese of about 35 kg is obtained from the 400 l of milk used. Its pH is 5.27±0.02. Its percentage of dry extract is 60%.

The cheese is then ripened in the following manner:
In a cold cellar: at 8°–10° C. for some days, according to the judgement of the technician.

In a warm cellar: at 16°–18° C. for 1 to 2 months, according to the judgement of the technician.

Throughout the stay in the warm cellar, the cheese is rubbed on the surface at a frequency of twice weekly with a slightly saline solution seeded with cheese smear (surface flora of this type of cheese) according to the traditional technique.

Return to the cold cellar: at 6°–7° C. for at least 2 months.

The principal data read off are collected in the table which follows.

EXAMPLE 2—according to the invention

It is distinguished with respect to the manufacture described in Example 1 by the following points:

The pH of the milk on arrival at the plant is 6.66±0.02.

The mesophilic lactic ferments introduced at the start of maturation in Example 1 are employed at the same concentration but introduced just before renneting.

40 g of crystalline gluconodeltalactone marketed by the ROQUETTE FRERES Company are introduced into the 400 l of milk in the storage tank, that is to say, the day before in the evening, which is equivalent to a concentration of 10 g/hl of milk. The mechanical stirrer present in the tank permits the solubilization of the GDL.

The principal data read off are collected in the following table.

TABLE

| Preparation of comte type cooked pressed cheeses | | |
|---|---|---|
| | Example 1 | Example 2 |
| Initial pH of the milk (±0.02) | 6.70 | 6.66 |
| Maturation | | |
| GDL (g/hl) | — | 10 |
| Mesophilic lactic ferments (%) | 0.1 | — |
| Thermophilic streptococci (%) | 0.1 | 0.1 |
| Thermophilic mixed lactic ferments (%) | 0.05 | 0.05 |
| Renneting | | |
| pH on renneting (±0.02) | 6.63 | 6.59 |
| Dose of coagulating enzymes (ml/l) | 0.17 | 0.17 |
| Mesophilic lactic ferments (%) | — | 0.1 |
| Setting time (min.) | 25 | 26 |
| Heating - grinding | | |
| pH on moulding (±0.02) | 6.50 | — |
| Taking from the mould | | |
| pH of the cheese (±0.02) | 5.27 | 5.30 |
| Dry extract (%) | 59.8 | 59.8 |

We claim:
1. A process for manufacturing cooked pressed cheeses from milk wherein the milk is acidified in a reproducible and reliable manner for renneting, comprising the steps of:
providing a given volume of milk from which the cooked pressed cheese is to be prepared;
measuring the initial pH and the temperature of said milk;
selecting a period of time within which the pH of the milk will be brought from the initial pH to a renneting pH, said renneting pH being between 6.40 and 6.70 and said renneting pH being the required renneting pH for the type of cooked pressed cheese being manufactured;
acidifying the milk for renneting solely by adding an acidogen to the milk, said acidogen being selected from the group consisting of gluconolactones and glucoheptonolactones and said acidogen being added to the milk in an amount which is the minimum amount required to bring the initial pH of the milk to the renneting pH within the selected period of time, said minimum amount of acidogen being determined based on the kinetics of transformation of the acidogen at said temperature of the milk and as a function of the volume of the milk and the selected period of time, whereby the milk is acidified for renneting and brought from the initial pH to the renneting pH solely by the acidogen;
renneting the prepared milk by adding coagulating enzymes to the prepared milk; and then
coagulating;
dividing the coagulum;
cooking;
grinding;
molding;
pressing;
removing from the mold; and
ripening.

2. A process of claim 1, further comprising the step of adding lactic ferments to the milk prior to renneting, said lactic ferments being adding for organoleptic and textural purposes only and being added at a time and in an amount such that the lactic ferments do not influence acidification for obtaining the renneting pH of the milk by the acidogen.

3. A process according to claim 1, wherein the acidogen is introduced into a raw milk.

4. A process according to claim 1, wherein the acidogen is introduced into a raw milk having undergone a heat treatment.

5. A process according to claim 1, wherein the amount of acidogen employed is from 1 to 500 g/hl of milk.

6. A process according to claim 5, wherein the amount of acidogen employed is between 2 and 200 g/hl of milk.

7. A process according to claim 1, wherein the acidogen is gluconodeltalactone (GDL).

8. A process according to claim 7, wherein the amount of GDL employed is from 1 to 100 g/hl of milk.

9. A process according to claim 8, wherein the amount of GDL employed is between 2 and 50 g/hl of milk.

* * * * *